(12) United States Patent
Nussbaum

(10) Patent No.: US 6,923,593 B2
(45) Date of Patent: Aug. 2, 2005

(54) LOCKING MEMBER AND DEVICE

(75) Inventor: Augustin Nussbaum, Neuchâtel (CH)

(73) Assignee: The Swatch Group Management Services AG, Biel (CH)

(*) Notice: Subject to any disclaimer, the term of this patent is extended or adjusted under 35 U.S.C. 154(b) by 4 days.

(21) Appl. No.: 10/403,029

(22) Filed: Apr. 1, 2003

(65) Prior Publication Data
US 2003/0190185 A1 Oct. 9, 2003

(30) Foreign Application Priority Data
Apr. 4, 2002 (CH) .............................................. 0574/02

(51) Int. Cl.$^7$ .......................... B25G 3/18; G04B 37/00
(52) U.S. Cl. ..................... 403/328; 403/315; 403/316; 403/319; 403/326; 403/327; 24/265 B; 24/265 WS
(58) Field of Search ................................ 403/315–319, 403/326–329; 24/265 B, 265 WS; 368/282, 313; 267/40, 181, 263, 182, 159, 160

(56) References Cited

U.S. PATENT DOCUMENTS

| | | | | |
|---|---|---|---|---|
| 2,171,185 A | * | 8/1939 | Maier | |
| 2,375,357 A | * | 5/1945 | Friedman | |
| 3,824,783 A | * | 7/1974 | Nadeau | 368/282 |
| 3,871,777 A | * | 3/1975 | Sauer | 403/317 |
| 4,083,642 A | * | 4/1978 | Journee | 403/316 |
| 5,062,619 A | * | 11/1991 | Sato | 267/181 |
| 5,398,218 A | * | 3/1995 | Munnier et al. | 368/282 |
| 5,951,193 A | | 9/1999 | Tanaka et al. | |
| 6,071,034 A | * | 6/2000 | Cavagna | 403/319 |

FOREIGN PATENT DOCUMENTS

EP   0 714 051 A1   5/1996

OTHER PUBLICATIONS

Merriam–Webster's Collegiate Dictionary, 1998, Merriam–Webster, Inc., Tenth Edition, p. 682.*

* cited by examiner

Primary Examiner—Daniel P. Stodola
Assistant Examiner—Victor MacArthur
(74) Attorney, Agent, or Firm—Sughrue Mion, PLLC

(57) ABSTRACT

There is disclosed a device (1, 34) for positioning a first element (24) with respect to at least a second element (25) by means of a resilient locking member made in a single piece and having two ends (2, 3) connected by a bar (4) capable of being resiliently deformed in its axial direction (5). The longitudinal resilience of the bar (4) is due to the fact that it includes a plurality of apertures (11) over its length, said apertures (11) being located alternately on either side of a median plane (14) of the bar (4). This locking member can easily be manufactured in the form of a moulded plastic part.

18 Claims, 2 Drawing Sheets

LOCKING MEMBER AND DEVICE

BACKGROUND OF THE INVENTION

The present invention concerns a locking member for holding a first element relative to a second element, comprising a head arranged for co-operating with the second element, one end opposite the head, and an intermediate portion that can deform elastically in a longitudinal direction of said member and integral with the head and the opposite end.

More precisely, according to a first aspect, the present invention concerns a pin, the opposite end of which forms a tail, arranged to be disposed in a recess provided in the first element.

Similar devices are known from the prior art in various areas of application, like for example in the horological field.

Indeed, the certificate of addition No. 41 060 to French Patent No. 712 868 granted to René-Alfred Chauvot, discloses the use of pins in a watch whose case is capable of sliding in its support and can turn completely on itself. More precisely, this document discloses two types of slightly different pins fulfilling different functions. "Pivot-pins", one of which is shown in FIG. 6 of the aforementioned certificate of addition, are arranged in the watchcase and have projecting portions provided for sliding into corresponding grooves of the support. On the other hand, "ball locking members", illustrated in FIG. 5 of the same document, are also arranged projecting in the case to ensure the holding thereof in the support when it is in its rest positions.

These two devices have similar respective structures as can be seen in the aforecited Figures of the certificate of addition. Each of these devices in fact comprises a cylindrical casing forcibly driven in a cylindrical hole arranged in a first element, here the watchcase. A helical spring is arranged in the cylindrical casing, a first of its ends resting on the bottom of the cylindrical hole, the second end resting against the base of a "pivot-pin" or against a ball. Further, it will be noted that the upper edges of each of the cylindrical casings are bent inwards, so as to allow a part of the pivot-pin or the ball to have a projecting portion with respect to the cylindrical casing, while preventing them from being completely ejected.

The pivot-pin device is typically used in applications requiring the movement of the first element to be guided with respect to a second element, the movement being of the rotational and/or sliding type.

On the other hand, the ball device is typically used as a locking member. Indeed, replacing the pin with a ball facilitates the sliding of a second element along the surface of the first element as regards the locking member. This advantage is obtained particularly owing to the capacity of the ball to turn on itself, which is why this variant is typically implemented in devices for which locking operations are frequent.

However, the general structure that has just been described has a drawback in that it requires a plurality of components, which proves expensive when a significant number of them are manufactured, both in terms of manufacturing said components and the assembly thereof.

According to a second aspect, the present invention concerns a locking member, wherein at least the bar is capable of being housed in a through hole of the first element, the head and the opposite end being respectively arranged to co-operate respectively with a first and a second recess which are arranged in the second element.

More precisely, a member of this type can be implemented, for example, for making a fastening bar for a wristwatch bracelet. German Patent Application No. 31 34 761 discloses a device answering the aforementioned features. Indeed, this document discloses a metal wristwatch bracelet fastening bar made in a single piece. In the variant shown in FIG. 2 of this Patent Application, the central part of the bar has an undulated structure, in other words it has a succession of curves contained in the same plane. Consequently, the central part of the bar has resilient properties, particularly in the direction of its length, which allows its ends to be locked into the housing of the watchcase provided for this purpose. This wristwatch bracelet bar is made particularly using a press.

However, this device has certain drawbacks, such as a compactness that could be improved. Indeed, the resilient properties of the structure described are obtained via a sinuous shape of the bar in one plane, which means that the lateral dimensions of the bar finally obtained are not negligible, particularly within the scope of an application to wristwatch bracelet bars. Further, it will be noted, in FIG. 2 of the aforecited Patent Application, that the ends of the bar are not held in fixed positions with respect to the wristband in which it is positioned. The ends can be moved either via the effect of the bar rotating on itself, or because of a lateral resilient deformation of the bar in the absence of any lateral guiding.

SUMMARY OF THE INVENTION

It is a first object of the present invention to perfect the locking members of the aforecited types by adding a simplification to their structure and assembly, in addition to increased compactness.

Thus, the invention provides, in particular, a locking member of the type indicated hereinbefore, characterised in that the intermediate portion is formed by a bar, which, transversely, has smaller external dimensions than the head and the opposite end.

The maximum transverse dimensions of the locking member according to the invention are thus defined by the respective transverse dimensions of the head and the end opposite the head. Thus, the bar has sufficient space around its periphery to be able to be compressed in the direction of its length, despite certain transverse deformations accompanying the compression.

In a preferred embodiment, the locking member according to the invention is made by conventional moulding of a plastic material, the longitudinal resilience of the bar being provided by its particular structure. For this purpose, the bar preferably has a cylindrical shape and includes a plurality of transverse apertures along its length, allowing it to be compressed within the limits of the resilience of the material used for the manufacture thereof.

Further, the locking member according to the invention preferably includes lateral guide means, formed by cylindrical bulges by way of example, allowing it to have significant lateral stability with respect to its housing.

One thus obtains a locking member working in an equivalent manner to those of the aforecited prior art, but having a lower manufacturing cost and much simpler assembly. Moreover, the locking member according to the invention allows precise relative positioning of the two elements.

An additional object of the present invention concerns a locking member comprising particularly the locking member described hereinbefore associated with a first and a second element that need to be positioned in relation to each other.

BRIEF DESCRIPTION OF THE DRAWINGS

The invention will be better understood using the following description of different embodiment examples with reference to the annexed drawings, in which.

DETAILED DESCRIPTION OF THE INVENTION

Figure 1:
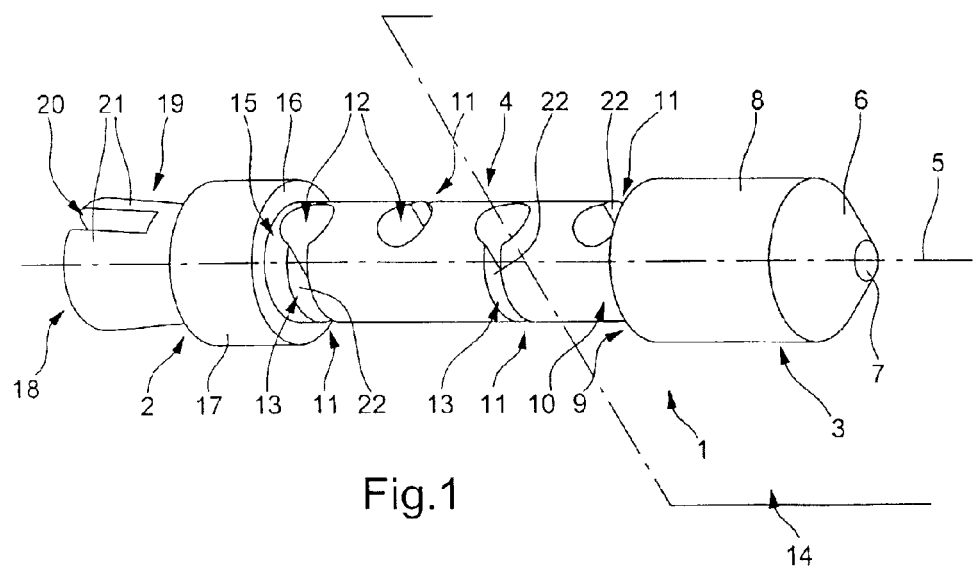
FIG. 1 is a perspective view of the locking member according to a first aspect of the present invention.
Figure 2:
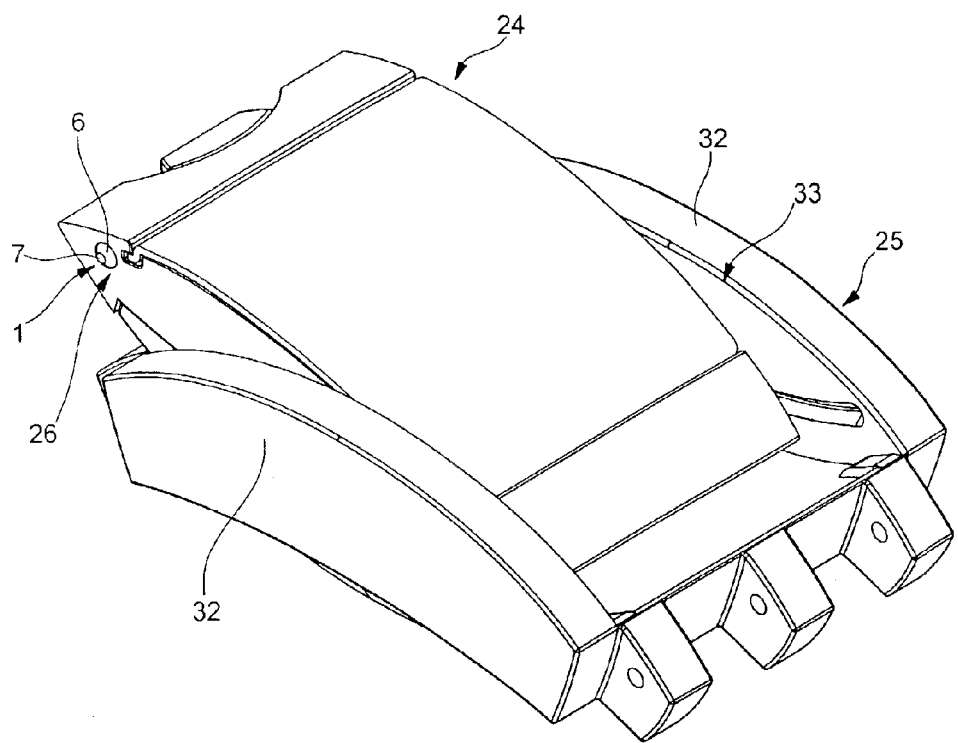
FIG. 2 is a perspective view of a simple mechanical construction example comprising the locking member according to the present invention.
Figure 3:
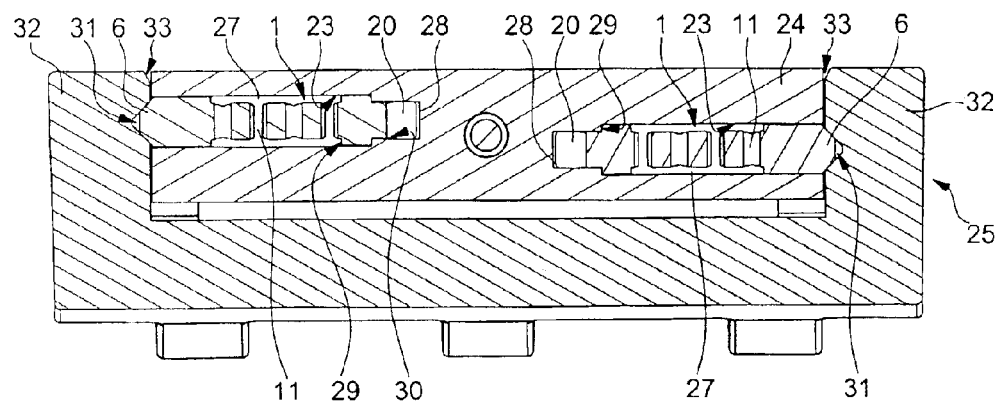
FIG. 3 is a cross-section of the construction of FIG. 2, illustrating the operation of the locking member according to the present invention.

FIGS. 1 to 3 illustrate respectively the structure and working of a locking member 1 and the corresponding device made according to a first aspect of the present invention.

In the perspective view of FIG. 1, it will be noted that the locking member, also called "pin" hereinafter, has a generally cylindrical shape comprising three main portions, namely two ends forming respectively a tail 2 and a head 3 delimiting an intermediate portion forming a bar 4.

In the preferred embodiment shown in these Figures, the casing of pin 1 according to the invention has rotational symmetry about axis 5.

However, one can imagine that certain parts at least of the locking member have sections of other shapes, particularly rectangular or square shapes.

Head 3 has a mainly cylindrical shape with a truncated type end in its distal part 6, the section of which decreases in the direction of end 7. The way in which distal part 6 of head 3 is made is not limited to the representation of the aforementioned Figures and those skilled in the art will know how to find other variants allowing head 3 to fulfil its function, like for example in the shape of a dome.

Behind its cylindrical proximal part 8, head 3 ends in a shoulder 9 leading to a reduction in section thus defining a first end of bar 4, bearing the reference 10. Said bar 4 has a generally cylindrical shape, preferably of axis 5, as shown in FIG. 1. It will also be noted that bar 4 includes four similar transverse apertures 11 distributed over its length. Each of these four transverse apertures 11 is formed of a cylindrical hole 12 passing right through bar 4, the axis of the cylindrical hole preferably intersecting axis 5 of pin 1, and a straight slot 13, whose median plane contains the axis of the corresponding cylindrical hole, extending from said cylindrical hole 12 as far as the periphery of bar 4. As can be seen in FIG. 1, the median plane of slot 13 is preferably chosen to be orthogonal to axis 5 of the pin and the width of slot 13 is preferably less than the diameter of cylindrical hole 12 for reasons that will be explained hereinafter.

Further, cylindrical holes 12 are regularly spaced along bar 4 and their respective axes are all parallel to each other, defining a median plane 14 of the pin. The successive slots 13 are located alternately on either side of said median plane 14 of the pin.

Second end 15 of the bar is delimited by an annular shoulder 16 also delimiting proximal portion 17 of tail 2 of the pin, the annular shoulder 16 having a cylindrical shape of larger diameter than bar 4.

Cylindrical proximal portion 17 is followed, in the direction of end 18 of pin 1, by a truncated distal part 19 with initial and end sections smaller than that of said proximal portion 17, the end section being larger than the initial section.

Said truncated part 19 comprises a slot 20, whose edges are defined by two planes that are parallel to each other and preferably parallel to median plane 14 of the pin. In particular, median plane 14 of pin 1 is also a median plane for slot 20. The presence of slot 20 divides distal portion 19 of tail 2 into two tongues 21, which are flexible transversely.

Preferably, pin 1 that has just been described, is made in a single piece of plastic material, by a conventional type of injection moulding. It should be noted that the embodiment illustrated in the Figures has a particular simplicity as regards the mould necessary for the manufacture thereof, which does not require the use of slides, insofar as all the generating lines of the various apertures 11, 20 are substantially parallel. Since the method is conventional, it will not be discussed in detail as the one skilled in the art will know how to adapt the teaching of the present Application to its own needs using its knowledge.

It can be deduced without any difficulty from the preceding description that bar 4 of the pin has resilient properties in the direction of its length, i.e. in its axial direction 5. Indeed, depending upon the type of plastic used to make it and due to the presence of apertures 11 arranged along its length, pin 1 according to the present invention is capable of more or less being deformed longitudinally when an axial force is exerted thereon. Insofar as each material has its own resilience limit, stops must be provided on the pin to limit the maximum possible deformation amplitude in the event of strong compression. In the case of pin 1 shown in FIG. 1, stops are obtained very simply insofar as they are directly formed by walls 22 of each of slots 13. Indeed, the width of slots 13 is preferably adjusted such that a deformation of amplitude such that two opposite walls 22 of a slot 13 come into contact with each other is possible without causing breakage or permanent deformation of pin 1. Of course, those skilled in the art will not encounter any particular difficulty in determining the maximum width of slots 13 to be made as a function of the material they have used to construct the pin.

Of course, the structure of the locking member according to the first aspect is not limited to that which has just been described. One can, for example, use different shapes, spacing or numbers of apertures 11.

FIGS. 2 and 3 show two locking pins 1 according to FIG. 1, arranged in a simple mechanical construction, so as to illustrate the operation thereof.

The two locking pins 1 are arranged in respective holes 23 (visible in FIG. 3) arranged on either side of a first element that has to be correctly positioned with respect to a second element.

The mechanical construction shown in FIGS. 2 and 3 corresponds to a wristwatch (the wristband is not shown) comprising a case 24 capable of turning over in its support 25 to show, on the top, one or other of its faces in two respective rest positions. This application thus corresponds to that described hereinbefore, in relation to the discussion of the prior art relating to the first aspect of the present invention.

One can see in FIG. 2, end 7 of head 3 of one of the pins arranged in case 24 of the watch, said end 7 emerging from a surface 26 of the case. The application shown in these Figures illustrates the use of pins 1 as locking members allowing case 24 to be locked with respect to a support 25 in one or other of its two rest positions. The configuration shown can thus correspond either to the start of an operation for turning case 24 over following its release from its support 25, or the end of a turning over operation which will end with case 24 being locked in its support 25 using said pins 1.

FIG. 3 illustrates the working of pins 1 in more detail. Blind holes 23 are arranged in watchcase 24 to each receive one of the two positioning pins 1. Each of these holes 23 includes a first cylindrical portion 27 and, in the region of its inner end 28, a shoulder 29 leading to a decrease of the section of the hole to said inner end 28, forming a second cylindrical portion 30. The total length of each of these holes 23 is less than the total length of pin 1 such that only the truncated distal part 6 of head 3 of the pin projects beyond it when the pin is in place and in its rest position. The length of the second portion 30 of each of holes 23 is slightly greater than the length of truncated part 19 of tail 2 of the corresponding pin. The diameter of the second portion 30 of hole 23 is slightly less than the greatest diameter of truncated part 19 of tail 2 of the pin. The diameter of the first portion 27 of hole 23 is substantially greater than the greatest diameter of pin 1, in other words than the diameter of the respective proximal parts 8, 17 of head 3 and tail 2.

It will thus be understood that a pin is inserted into its hole by sliding, following an application of axial pressure exerted by an operator on pin head 3 towards the inside of hole 23. Of course, in the present case this insertion occurs while watchcase 24 and its support 25 are not positioned facing each other.

When tail 2 of the pin reaches the level of shoulder 29, the operator has to exert greater axial pressure to deform elastically the two tongues 21 of tail 2 so as to allow truncated portion 19 to be inserted in the region closest to its inner end 28. The insertion of the pin is then stopped by proximal part 17 of the pin tail abutting against shoulder 29. Pin 1 is held in place in its housing by friction of distal part 19 of its tail against the wall of second portion 30 of hole 23.

Depending upon the holding force desired for pin 1 in its hole 23, the insertion of distal part 19 of the tail in second portion 30 or its hole 23 can be more or less difficult. The pressure necessary from the operator in certain cases can thus cause signification deformation of the pin, this pressure typically being higher than the pressure subsequently applied, during common use, for example in locking operations. This is why it is necessary to provide stops 22 in apertures 11 of the pin, their first function being to prevent the pin breaking when it is set in place.

Once pins 1 are in place in their respective holes 23, they can fulfil their locking member function with support 25 of watchcase 24, operating in an identical manner to that described in relation to the device of the prior art relating to the first aspect of the present invention. Indeed, substantially conical recesses 31 are arranged in each of lateral walls 32 of support 25 to receive truncated end 6 projecting from respective pin heads 3, when watchcase 24 is arranged in one of its rest positions. Moreover, chamfers 33 are arranged on the upper edges of said lateral walls 32 to facilitate the setting in place of case 24 in its support 25 at the end of the turning over movement. Thus, in the configuration shown in FIG. 2, when the watchcase is lowered to be set in a rest position, truncated portion 6 of each pin head 3 comes into contact with chamfer 33 of wall 32 of the corresponding support. Continuous pressure from the operator then results in generation of an axial component pressure force on each of pin heads 3. When said axial component has sufficient intensity, head 3 of each pin forces the corresponding pin bar 4 to contract, thus allowing head 3 to completely enter hole 23 of the case. Bar 4 can then only extend and head 3 can only come out of hole 23 once case 24 is completely set in place in support 25 and its pin hole 23 is facing the corresponding recess 31 in the support. Case 24 is then held in place by being locked into support 25, in the desired rest position.

Further, the respective cylindrical portions 8, 17 of head 3 and pin tail 2 play the part of cylindrical bulges ensuring that pin 1 is held radially in its hole 23, while allowing bar 4 to compress. In fact, when bar 4 contracts, it undergoes lateral deflections by the bending of its thinner parts, adjacent to apertures 11. These deflections are made possible due to differences in respective diameters between hole 23 and bar 4.

It will thus be noted that the device according to the present invention operates identically to the aforecited devices of the prior art, but advantageously in relation to the latter in that the number of its constituents is lower, it is more compact and its manufacturing method is simpler.

Figure 4:
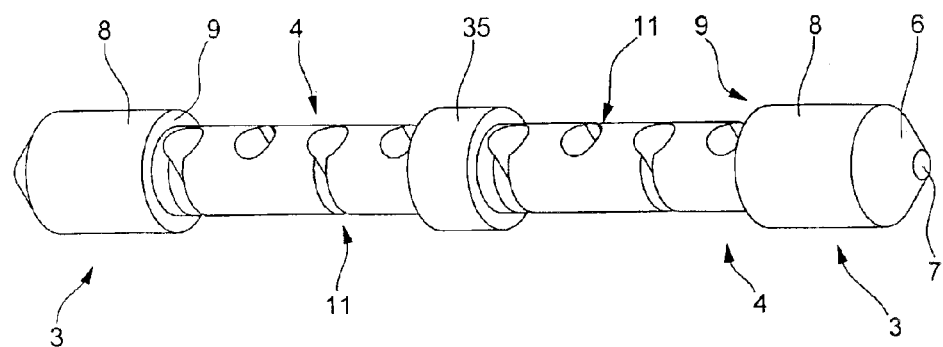
FIG. 4 is a perspective view of the locking member according to a second aspect of the present invention.

FIG. 4 illustrates a second aspect of the locking member according to the present invention. Said member 34 has a similar structure to that of the first embodiment, the common elements being thus designated by the same reference numerals.

In this second embodiment, the positioning device, which can be termed a spring lug 34, includes two heads 3 whose proximal ends 8 end at the back in shoulders 9 delimiting a bar 4 of generally cylindrical shape. As previously, heads 3 each include a cylindrical proximal portion 8 and a truncated distal portion 6, the diameter of cylindrical portion 8 being greater than the diameter of bar 4. Bar 4 includes a plurality of apertures 11 similar to those of the first embodiment, said apertures 11 preferably being regularly spaced along the length of bar 4. Thus, the stresses undergone by the bar during compression are distributed substantially uniformly over its length.

Spring lug 34 further includes a cylindrical bulge 35 arranged in the middle region of bar 4, having a substantially equal diameter to that of cylindrical portions 8 of the heads and contributing to the radial holding of bar 4 in its hole (not shown). The diameter of bulge 35 may also be slightly greater than the diameter of the hole provided for receiving spring lug 34, such that said bulge 35 also fulfils a function of holding spring lug 34 in its hole via friction.

Of course, other means may be provided for holding spring lug 34 in its hole, like for example a transverse pin or a click, arranged in the hole to co-operate with bulge 35.

In order to illustrate an application of spring lug 34, one may for example imagine a similar configuration to that shown in FIG. 3, wherein the two pins 1 according to the first embodiment are replaced by a single spring lug 34 according to the second embodiment, arranged in a cylindrical hole passing right through watchcase 24.

Of course, this application example was given by way of non limiting indication and the spring lug according to the invention can be used in any application requiring the use of two locking members arranged on either side of the same element or on the same part of an element.

In particular, one could use such a spring lug to fulfil the function of snugs (not shown) used for holding watchcase 24 and allowing it to slide in the grooves of its support 25.

One could, in particular, imagine the use of locking member 34 according to the second embodiment as a bar fastening a wristband to a watchcase. Each head could end in a cylindrical snug instead of truncated part 6. In this case, the corresponding watch would be classified in a low price range, because of the upper fragility of the device according to the invention, made of plastic material compared to a metal bar. This drawback of spring lug 34 is however, compensated for by its low manufacturing cost.

It should be noted that compared to the metal bar of the aforementioned prior art, spring lug 34 according to the invention provides an easier and more stable solution for use. In fact, the common structure of the two heads 3 of spring lug 34 which have just been described gives the device great radial stability because of the presence of cylindrical portions 8 or bulges whose diameter is substantially fitted to that of the hole of the first element.

The preceding description is not limited to the possible fields of application of the device according to the invention to watchmaking. Indeed, said device can be used in all cases where positioning or locking members are necessary and where the head does not necessarily have to have very great lateral resistance to breakage.

The present invention can for example be implemented for locking all sorts of plastic cases with a lid or a cover, such as computer central processing units, plastic casings for domestic or portable appliances, toys or other similar apparatus.

Of course, the construction of said device is not limited to the embodiments described, particularly as regards the particular structures described or the choice of materials used. The locking member may not be strictly made in a single piece and, for example the head may be reinforced by a metal insert or a cap of hard material.

What is claimed is:

1. An arrangement holding a first element with respect to a second element, comprising
   a locking member comprising a head, one end opposite said head and an intermediate portion able to be deformed resiliently in a longitudinal direction of said member and made in a single piece with said head and said end, said intermediate portion being formed by a longitudinal bar which, transversely, has smaller external dimensions than said head and said opposite end,
   said head having, in a distal portion, a truncated end with a section decreasing in diameter in the direction away from said intermediate portion,
   said arrangement comprising a hole opening out in a surface of said first element and in which is arranged said locking member,
   said arrangement further comprising a recess provided in a surface of said second element facing said surface of said first element,
   wherein said locking member is able to be compressed into said hole to allow a translation movement of said second element with respect to said first element in a direction substantially transverse to said longitudinal direction to a point when said recess faces said hole, at which point said locking member relaxes so that said distal portion penetrates into said recess.

2. The arrangement according to claim 1, wherein said end opposite the head of said locking member forms a tail comprising means for holding said member axially in said first element,
   wherein said hole includes, from said surface of said first element, a first substantially cylindrical portion terminated by a shoulder delimiting a second substantially cylindrical portion, of smaller diameter than that of said first portion, extending to the bottom of said hole, and wherein the diameter of said second portion has a slightly smaller diameter than the diameter of said tail.

3. The arrangement according to claim 2, wherein said hole is of cylindrical shape.

4. The arrangement according to claim 1, wherein said longitudinal bar is substantially rectilinear when said bar is in a rest position.

5. The arrangement according to claim 4, wherein said longitudinal bar comprises a plurality of transverse apertures along at least a part of its length, two consecutive apertures opening out respectively on either side of a median plane of said bar.

6. The arrangement according to claim 5, wherein each of said apertures comprises a first substantially cylindrical part having an axis which is substantially contained in said median plane, and a second slot-shaped part having generating lines which are substantially parallel to said axis, said slot extending from said first part as far as a periphery of said longitudinal bar.

7. The arrangement according to claim 6, wherein said head and said opposite end further comprises a lateral guide.

8. The arrangement according to claim 7, wherein said locking member has a general shape having rotational symmetry, and wherein said lateral guide comprises at least two substantially cylindrical bulges at a distance from each other along said member, said bulges having approximately equal diameters, greater than the diameter of said longitudinal bar.

9. The arrangement according to claim 8, wherein said locking member includes a bulge of approximately equal section to the maximum section of a head and located substantially in the middle of said longitudinal bar, and wherein said end opposite said head forms a second head arranged to co-operate with said second element.

10. The arrangement according to claim 7, wherein said end opposite said head forms a second head arranged to co-operate with said second element.

11. The arrangement according to claim 1, wherein said longitudinal bar comprises a plurality of transverse apertures along at least a part of its length, two consecutive apertures opening out respectively on either side of a median plane of said bar.

12. The arrangement according to claim 1, wherein said head and said opposite each further comprises a lateral guide.

13. The arrangement according to claim 1, wherein said locking member has a general shape having rotational symmetry.

14. The arrangement according to claim 1, wherein said locking member is made of plastic material.

15. The arrangement according to claim 1, wherein said end opposite said head forms a tail comprising means for holding said member axially in said first element.

16. The arrangement according to claim 15, wherein said means for holding comprises a distal region of said tail, of cone truncated shape and comprising at least one longitudinal slot forming a tongue that is flexible transversely to hold said member in said first element.

17. The arrangement according to claim 1, wherein said end opposite said head forms a second head arranged to co-operate with said second element.

18. The arrangement according to claim 1, wherein the first and the second elements are in a portable device.

* * * * *